UNITED STATES PATENT OFFICE.

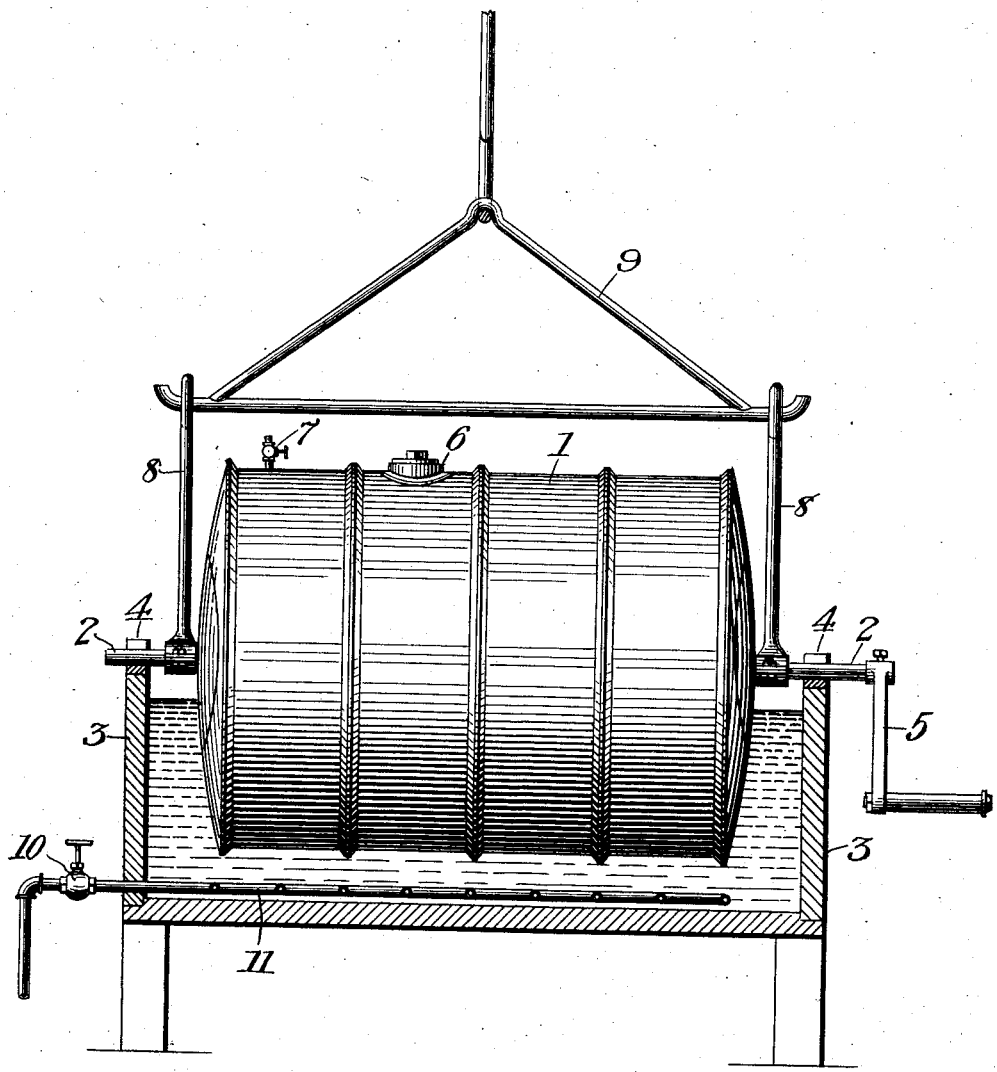

BYRON O. CLARK, OF HONOLULU, TERRITORY OF HAWAII.

APPARATUS FOR TREATING FRUIT-JUICES AND THE LIKE.

1,062,888. Specification of Letters Patent. Patented May 27, 1913.

Application filed January 22, 1912. Serial No. 672,589.

*To all whom it may concern:*

Be it known that I, BYRON O. CLARK, a citizen of the United States, residing at Honolulu, in the county of Honolulu, Territory of Hawaii, have invented certain new and useful Improvements in Apparatus for Treating Fruit-Juices and the Like; and I do hereby declare the following to be a full, clear, and exact description of the invention, such as will enable others skilled in the art to which it appertains to make and use the same.

This invention relates to apparatus for treating fruit juices and other fluids, such as cane juices, milk, etc.; and its object is to produce apparatus of this character which shall be efficient in both mixing and heating the juices, and be easily operated thereby saving labor.

The invention consists in the combination and arrangement of parts as will hereinafter fully appear.

In the accompanying drawing, forming a part of this specification, the figure represents in side elevation and part section apparatus embodying my invention.

Referring to the drawing, the drum 1 is provided at its longitudinal axis with the shaft 2. The ends of the rectangular open tank 3 support boxes 4 adapted to receive the shaft 2. A crank 5 is secured to one end of the shaft 2 outside of the tank 3 and box 4. The drum 1 is also provided with a plug 6 and a pet cock 7. One end of each of the arms 8 loosely engages the shaft 2 between the heads of the drum 1 and the boxes 4. The yoke 9 is hooked into eyes at the outer ends of the arms 8. Steam is admitted through the valve 10 to the coil 11 in the bottom of the tank 3.

The operation of the apparatus will now be apparent. The plug 6 is removed and the material to be treated is admitted to the drum 1, and the plug 6 is then replaced. By means of a chain hoist or tackle applied to the yoke 9 the drum is then lifted into the tank 3 and lowered until the shaft 2 rests in the boxes 4. The tank 3 is filled with water as shown. Steam is admitted through the valve 10 into the coil 11 and the water in the tank 3 is heated thereby to any desired temperature. By means of the crank 5, the drum 1 is revolved and the mixing of material within the drum is thereby effected while it is being heated, as a portion of the drum is always in contact with the heated water in the tank 3. The pressure within the drum caused by the increase in the temperature is relieved at intervals by opening the pet cock 7.

It is obvious that the ends of the drum could be provided with trunnions in lieu of the shaft 2. In the larger sizes where the drum when filled is heavy, instead of applying the crank 5 directly to the shaft 2 a gear and pinion may be introduced in a well known manner, and be power driven if desired.

I claim:

1. Apparatus for treating fruit juices and the like, comprising an open tank adapted to contain water, means to heat the water, open U-shaped bearings associated with the walls of said tank, and an imperforate drum for holding the material to be treated journaled in said bearings and freely removable therefrom, and means to rotate the drum.

2. Apparatus for treating fruit juices and the like, comprising an open tank adapted to contain water, means to heat the water, open U-shaped bearings associated with the walls of said tank, an imperforate drum for holding the material to be treated journaled in said bearings and freely movable therefrom, means to rotate the drum, and means to remove said drum from the bearings.

3. Apparatus for treating fruit juices and the like, comprising a tank containing water, means to heat the same, open U-shaped bearings in the walls of said tank, an imperforate drum for holding the material to be treated having a shaft journaled in said bearings and freely removable therefrom, means to rotate the drum, and means engaging said shaft at each extremity of the drum adapted to lift the drum from the bearings.

In testimony whereof I affix my signature, in presence of two witnesses.

BYRON O. CLARK.

Witnesses:
ROBT. J. PRATT,
HENRY DAVIS.

Copies of this patent may be obtained for five cents each, by addressing the "Commissioner of Patents, Washington, D. C."